March 10, 1970  J. W. EDWARDS  3,499,697
PELLUCID LAMINATE WITH INTERFERENCE FILTER MULTILAYER AND MONOLAYER
Filed Jan. 4, 1965  4 Sheets-Sheet 1

INVENTOR
JAMES W. EDWARDS
BY
Robert J. Schaap
ATTORNEY

FIG. 8 — RAY DIAGRAM FOR COATED GLASS FOR INCIDENCE ON GLASS SIDE

FIG. 9  RAY DIAGRAM FOR COATED GLASS FOR INCIDENCE ON COATED SIDE

INVENTOR
JAMES W. EDWARDS
BY
*Robert J. Schaap*
ATTORNEY

United States Patent Office 3,499,697
Patented Mar. 10, 1970

3,499,697
PELLUCID LAMINATE WITH INTERFERENCE
FILTER MULTILAYER AND MONOLAYER
James W. Edwards, Creve Coeur, Mo., assignor to
Monsanta Company, St. Louis, Mo., a corporation
of Delaware
Filed Jan. 4, 1965, Ser. No. 423,263
Int. Cl. G02b 5/20, 5/28, 13/14
U.S. Cl. 350—1                                      7 Claims

ABSTRACT OF THE DISCLOSURE

A pellucid laminate for selectively reflecting infrared radiation and transmitting visible wave lengths of radiation. The laminate includes a pair of outer panels. A relatively thin member formed of plastic has a multilayer dielectric film deposited on one surface thereof and a monolayer dielectric film depostied upon the opposite surface thereof. The multilayer film engages a relatively thin plastic film formed on the interior surface of one of the panels. The film is in the order of magnitude of thickness of the multilayer film so that during the lamination process any particles in the multilayer film will not become disoriented. The monolayer film in combination with the multilayer film is designed to cause some reflection of the transmitted visible radiation. A relatively thick interior panel is disposed beneath the monolayer film and may have incorporated therein light absorbing compounds in order to reduce angular dependency. A number of methods of laminating the various components are also disclosed.

---

This invention relates in general to certain new and useful improvements in thin film optics, and more particularly to laminated structures employing optically thin films in combination with absorbing media which are suitable for altering the optical characteristics of transparent medias.

In the past few years, there has been an increasing tendency to construct buildings with non-load bearing walls or so-called "curtain wall" buildings and which employ glass extensively as the wall structure. However, large window areas create a number of serious problems, the foremost of which are glare and heat gain from direct solar radiation. It has been estimated that the extra load on air conditioning equipment caused by heat absorbed in the visible light from the sun increases the initial cost of air conditioning equipment from 33 to 50%. Initial installation costs of air conditioning to remove heat admitted as solar radiation frequently averages about ten cents per B.t.u. per hour per square foot. Peak solar radiation admitted by regular glass ranges between approximately 100 and 200 B.t.u. per hour per square foot. Therefore, the added cost for air conditioning per square foot of regular unshaded window glass due to solar radiation over a three to four hour period has been averaged to be approximately ten dollars ($10.00) to twenty dollars ($20.00) per square foot of window area. In order to obviate this problem, the windows are usually covered with blinds, shades, awnings and similar devices such as vertical louvers to reduce heat radiation with the result that the windows no longer serve their primary function as a viewing panel.

Another problem caused by solar radiation is that of glare or the amount of harshness in transmitting light. In the past, the elimination or reduction of glare has been accomplished by shading devices of the type above described. Glare has also been reduced in the past by architectural design such as large overhangs and deep window reveals. However, all of these methods of reducing glare and heat add to the initial cost and subsequent maintenance of the building and more importantly, reduce the effectiveness of the window for its primary purpose.

There have been many approaches to the designing of window glass in order to solve many of these fenestration problems. In the past, most of the efforts have been directed to the incorporation of various color reducing and glare reducing compounds to the liquid composition during the manufacture of sheet glass. Accordingly, there are many commercially available heat absorbing glasses, light absorbing glasses and combination heat and light absorbing glasses. By heat absorption alone, up to 50 percent of the normally transmitted solar radiation can be halted. However, the absorbing of heat by the glass causes considerable rise in the temperature of the glass so that a large portion of the energy which has been absorbed is actually reradiated to the interior of the structure. Thus, heat absorbing glass is not considered to be very efficient in order to solve these fenestration problems. This type of heat absorbing glass also admits excessive amounts of glare. In order to reduce the glare, it is necessary to resort to shading devices of the aforementioned type, which in effect, renders the heat absorbing properties of the glass useless.

Glare reducing glasses which function by absorption of visible light contribute significantly to eye comfort to exposures illuminated by direct solar radiation when their visible transmittance is within the range of 10 to 20 percent. However, conventional types of glare reducing glass transmit a great deal of radiation within infrared radiation wave lengths and hence are not capable of reflecting the heat bearing radiation. The visible light absorption also causes a heating of the glass panel and a condition of reradiation as infrared energy to the interior of the structure. This re-radiation of long wave length infrared radiation contributes significantly to the heat load in any particular structure.

In an attempt to obviate many of these fenestration problems, various filters have been deposited on the glass surfaces in order to reduce absorption of the heat bearing infrared radiation contained within solar radiation and to reduce glare. A very effective way of reducing the solar heat load is through the use of partially transparent metal films such as the type described in U.S. Patent No. 3,069,301. The structures described in this patent provide up to 70 percent total solar heat rejection of which a large part, approximately 52.3 percent of the ancient energy, is directly reflected. Moreover, eye comfort is maintained inasmuch as visible transmittance is only 13 percent of the total solar energy maintained upon the glass. While this type of window panel is very effective in reducing the transmittance of infra-red radiation, it has limited use because of its high visible reflectance. The high visible reflectance of the glass produces a mirror-like effect and this may be useful as a highlight effect in architectural design. However in most architectural applications, it is not desired to have glass with prominence or brilliance which will dominate the structure, but glass panels which will blend in with the architectural design. Moreover, interference filters of the type described in Patent No. 3,069,301 often create undesirable color effects in the absorbed visible light.

Another approach which has been employed is the use of metallic filters alone or in combination with one or more dielectric layers. However, metallic filters cause mirror-like effects which are totally undesirable from an architectural point of view. In order to solve the problems encountered with metallic films, there have been recent attempts to employ multilayer interference films with high and low index of refractions, respectively. These reflectors are given certain characteristics whereby they transmit substantial portions of light of one color and reflect substantial portions of light of another color. For example, they may be prepared with reflectance bands above 90% in the infrared wave length range while reflecting about 10% of visible light. Augmented by media for absorbing significant quantities of visible light to reduce glare, these films can be used in structures to give performance analogous to the metallic films. However, reflectors of this type are extremely sensitive to the angle of incidence of the light that the beam makes with the interference film. Accordingly, light directed at varying angles of incidence provides varying color presentations which are not desirable.

Aside from the optical problems of the interference filters themselves, the production of such filters has presented many difficult manufacturing problems to overcome. Normally, the filters are disposed upon a rigid but transparent substrate, such as glass or a heavy sheet of plastic. The films are commonly deposited by a conventional chemical deposition method or vaporizing method. These films are suitable for use even when they are not covered or combined in a laminated structure. However, an uncovered film was always subjected to weather or abrasion and such films are normally destroyed through use. Accordingly, these interference filters have usually been applied to a transparent substrate which is ultimately employed in a laminated structure. However, during the lamination process, the filter, which may consist of a multilayer film is often distorted. Moreover, the interference filter which may consist of multilayers of metals and metal oxides or other dielectrics often crack and are destroyed to an extent where the optics of the device are rendered totally unusable.

It is therefore the primary object of the present invention to provide a pellucid laminate with an optically thin dichroic filter which can be manufactured without materially altering the optical characteristics of the dichroic filter.

It is another object of the present invention to provide a pellucid laminate containing an optically thin dichroic filter of the type stated which, having a suitable light absorbing medium, is capable of reflecting substantially all of the heat-bearing infrared light contained in solar radiation while transmitting a controlled portion of the visible light.

It is a further object of the present invention to provide transparent laminates with optically thin films of the type stated which are capable of selectively altering the color of the transmitted visible light without materially affecting the quality or color fidelity of transmitted visible radiation.

It is an additional object of the present invention to provide pellucid laminates of the type stated which have high optical clarity and low scattering coefficients.

It is still another object of the present invention to provide pellucid laminates of the type stated which have high weather and abrasion resistance and can be mass produced on a minimum cost basis.

It is also an object of the present invention to provide a method of manufacturing optical laminates containing dichroic filters without destroying the filter in the lamination process.

It is another salient object of the present invention to provide pellucid laminates of the type stated which have characteristics of high infrared reflectance, controlled visible light reflectance and transmittance, and a good visual appearance compatible for architectural use.

With the above and other objects in view, my invention resides in the novel features of form, construction, arrangement, and combination of parts presently described and pointed out in the claims.

GENERAL DESCRIPTION

Generally speaking, the present invention provides a laminate which includes optical interference and absorption filtering means and a method of producing the laminate. The laminates of the present invention are preferably of a rigid construction and are attained by using panels which are resistant to scratching and to similar types of abrasions. One of the pellucid or transparent panels has a very thin layer of a polymeric plastic on one surface with a thickness in the range of approximately one micron. This plastic coated panel constitutes the first component of the laminate. This panel has a high infrared transmittance and low infrared absorbance so as to readily permit entry of solar infrared to the underlying reflecting films and to permit reflectance of selected wave lengths of radiation. A dichroic filter or so-called "interference filter" is applied to one surface of a relatively thin plastic sheet which is designed to resist high temperature distortion. Applied to the other side of the latter named plastic sheet is another dichroic filter in the form of a single layer dielectric film. This latter combination forms the second member of the laminate. The third member of the laminate consists of a relatively thick sheet of plastic material such as polyvinyl butyral. This plastic sheet of material is capable of being plasticized and may be incorporated with light absorbent materials or the normal color pigments normally found in the area of thin film optics. A fourth member of the laminate comprises the second outer pellucid or transparent panel. Naturally, the panels are transparent in the wave length range of radiation to be transmitted. The lower panel may have some radiation absorbing properties, but it should have a low radiation scattering coefficient to provide optical clarity. The entire structure of the four last named components are stacked in marginal registration and placed in a chamber under a vacuum. The components are then heated to a suitable lamination temperature and subjected to pressure to produce a single laminated structure.

As a modification of the present invention, the second component comprising the thin plastic sheet with dichroic filters on opposite sides thereof may be laminated or otherwise adhesively secured to the third component consisting of the relatively thick plastic layer, prior to the final lamination process. In this latter embodiment, the three components are then stacked in marginal registration and laminated in the manner previously described.

As another modification of the present invention, the second component comprising the thin plastic supporting sheet with dichroic filters on opposite sides thereof may be provided with the thin layer of polymerizable plastic which was deposited on the undersurface of one of the transparent panels. In this embodiment, this thin layer of polymerizable plastic is deposited on the upper surface of the dichroic filters. Accordingly, four components are provided which are then stacked in marginal registration and laminated in the manner previously described.

As an additional modification of the present invention, the second component comprising the thin plastic sheet with dichroic filters on opposite sides thereof may be laminated or otherwise adhesively secured to the third component consisting of the relatively thick plastic layer prior to the final lamination process. The thin layer of polymerizable plastic which was previously deposited on the undersurface of one of the transparent panels is thus deposited on the upper surface of the dichroic filter which is supported by the thin plastic sheet. In this embodiment, the three components are then stacked in marginal registration and laminated in the manner previously described.

DETAILED DESCRIPTION

Referring now in more detail and by reference characters to the drawings, which illustrate practical embodiments of the present invention, A designates a transparent laminate preferably of rigid construction and attained by using rigid panels 1, 2 which are resistant to scratching and similar abrasive action. Moreover, the panels 1, 2 are non-hydroscopic in nature and can be tinted, transparent or translucent in their nature. Illustrative of the materials from which the panels 1, 2 can be constructed are glass, rigid synthetic plastic materials, both thermoplastic and thermosetting in nature, such as polymethyl methacrylate, polystyrene, polyvinyl chloride, polypropylene, polyethylene terephthalate, cellulose acetate, cellulose nitrate and the like. It is understood that the panels 1, 2 must be transparent in the wavelength range of radiation to be transmitted.

Deposited on the underside of the panel 2 is a relatively thin film of plastic material 3 which may be thermoplastic or thermosetting in nature such as polyvinyl butyral, ethylenevinyl acetate, hydrolyzed ethylene-vinyl acetate, silicone polymers, cellulose acetate and many natural polymers such as rubber latices which have sufficient optical clarity. The most recommended of the aforementioned list of plastics is plasticized polyvinyl butyral. The plastic layer should not be less than 0.5 micron thick and should not be greater than 10.0 microns thick. The glass panel 2 with the plastic layer 3 thus constitutes the first component $C^1$ which is to be used in the laminate A.

Figure 1:
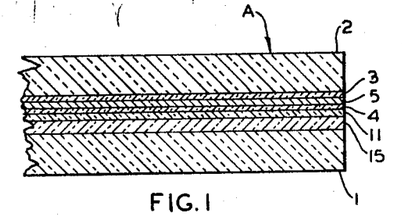
FIGURE 1 is a schematic front elevational view of a pellucid laminate constructed in accordance with and embodying the present invention.

A thin plastic supporting layer or sheet 4 having an overall thickness preferably within the range of 0.0025" to 0.0050" is provided with a multilayer dielectric film 5 on one surface thereof. The lower size limitation of the layer 4 is determined so that the layer has sufficient supporting strength. The plastic supporting layer 4 is preferably formed of a regenerated cellulose sheet (cellophane), polyethylene terephthalate (Mylar), polyvinyl butyral, or polyvinyl formal, or any similar type of plastic. The film 5 is located in facewise engagement with the plastic layer 3 substantially as shown in FIGURE 1. Construction of the multilayer optical film 5 is more fully described in my copending application Ser. No. 299,851, filed Aug. 5, 1963, now Patent No. 3,410,625 issued Nov. 12, 1968, and consists of alternating layers of dielectric materials having high and low refractive indices. The multilayer film 5 of the present invention has a design wave length in the range of 0.84 to 0.92 and preferably within the wavelength range of 0.86 to 0.88 microns. This design wavelength range is the center of a broad reflectance band chosen to give optimum reflectance of solar infrared radiation and a minimum reflection of solar visible radiation.

Figure 3:
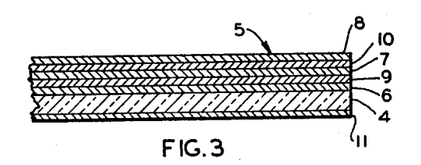
FIGURE 3 is an enlarged sectional view showing the details of the component designated as $C_2$ in FIGURE 2.

Referring to FIGURE 3, one type of multilayer film provided for use in the present invention is shown in detail. The film 5 thus illustrated consists of spaced layers of high refractive index materials 6, 7 and 8. Interposed between the high refractive index layers 6, 7 and 8 are low refractive index layers 9 and 10. In actual practice, each of the succeeding layers forming part of the multilayer film 5 are formed by a vapor film deposition. The present invention is not limited to this particular method of thin film application and any suitable conventional method can be employed. The high refractive index layers can be formed of any suitable dielectric material, such as zinc sulfide, zinc oxide, lead molybdate and lead tungstate. Similarly, any suitable transparent dielectric material having a low refractive index, such as cryolite, magnesium fluoride, lithium fluoride and aluminum fluoride could be used to form the layers 9 and 10.

In connection with the present invention, it has been found that by forming each of the high refractive index layers 6, 7 and 8 and each of the low refractive index layers 9 and 10 with an optical thickness of one-quarter wavelength for the maximum wavelength to be reflected at the center of the principal reflectance band, optimum results are obtained. For quarter-wave low refractive index layers, the thickness can be determined by the following relationship:

$$t_L = \frac{\lambda o}{4n_L}$$

where $t_L$ represents the thickness of the low index of refraction layers, $\lambda o$ represents the wavelength to be reflected at the center of the principal reflectance band, and $n_L$ represents the refractive index of the low refractive index layers. Similarly, for quarter-wave high refractive index layers, the thickness can be determined by the following relationship:

$$t_h = \frac{\lambda o}{4n_h}$$

where $t_h$ represents the thickness of the high refractive index layers, and $n_h$ represents the index of refraction of the high refractive index layers.

In the aforementioned copending application Ser. No. 299,851, filed Aug. 5, 1963, it was also described that a terminating layer can be employed to reduce maximum subsidiary reflections which are often obtained in multilayer films. It should be understood that the terminating layer described in the aforementioned copending application can also be employed in the multilayer film of the present invention.

Deposited on the underside of the supporting layer 4 is a single dielectric film 11 having a high index of refraction and also having an overall thickness determined in the manner set forth in the previously cited copending application. However, it has been found that suitable results have been achieved when the overall thickness of the dielectric film 11 is within the range of ⅛ to ½ wavelength for the principal wave length in the wavelength range to be reflected. The preferred single dielectric film 11 for the present application is lead oxide. The supporting layer 4 with the films 5 and 11 constitute the second components $C_2$ of the laminate A.

Figure 4:
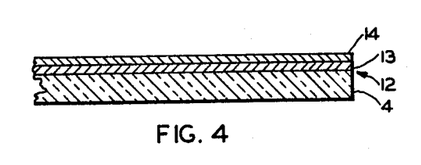
FIGURE 4 is an enlarged front elevational view of a modified from of the component designated as $C_2$ in FIGURE 2.

The multilayer film 5 can be suitably replaced by a dichroic filter 12 substantially as shown in FIGURE 4, in order to obtain a high degree of reflectance of infrared radiation. The dichroic filter 12 is similarly deposited upon the plastic layer 4 and includes a metal layer or reflecting surface 13 and one or more dielectric layers 14. The metal reflecting surface 13 is, of course, optically thin and can be vacuum deposited with any suitable metal such as silver, aluminum, zinc, titanium or tin. Increased reflectivity of white light can be obtained by using aluminum, rhodium, and an alloy sold under the trademark "Inconel" and containing approximately 80% nickel, 13% chromium and 6% iron as the metal reflecting surface. When a metal reflector is employed, the material having the low index of refraction is deposited facewise on the metal layer 13. The dielectric layer 14 may consist of a single film of a material having a low refractive index of the type mentioned or of a multilayer film consisting of alternating layers of high and low refractive index materials. Again, the thickness of the various layers is determined in the manner as previously described.

When using films of a quarter wavelength thickness, it is essential that the film of the lower refractive index be deposited on the metallic reflecting suface. The sequence of deposition would then be as follows: metal reflecting surface, low index film, high index film, low index film, high index film, etc. Increased reflectivity may also be obtained if a high index film about one-half wavelength in thickness is placed directly on the metal reflecting surface and then followed with superposed pairs of low-high index films with each film a quarter wave in thickness. The use of a sequence starting with a half-wave high index film on a metallic reflecting surface results in an increased dispersion of the reflectivity which is undesirable when the reflector is to be used with white light. Consequently for metal reflectors employed in the present invention, which are intended for normal use, namey, reflecting solar radiation, the sequence of quarter wave films would be: metal, low index film, high index film, etc.

The third component $C_3$ of the laminate A is then interposed between the thin plastic supporting layer 4 and the panel 1. The component $C_3$ consists of a plastic sheet 15, which is designed to reduce the angular dependency of color. The plastic sheet 15 is preferably formed of the same material from which the layer of plastic material 3 is formed, namely, polyvinyl butyral (plasticized), ethylene-vinyl acetate, hydrolyzed vinyl acetate, cellulose acetate and natural polymers with rubber latices having sufficient optical clarity. The most preferred plastic employed is the polyvinyl butyral and is designed to have a thickness of approximately 0.020 of an inch. The plastic sheet 15 can be formed with a light-absorbing medium including pigments such as carbon black, copper phthalocyanine, dibenzanthrone, alizarine cyanine green, indanthrone, chlorinated copper phthalocyanine and others, as well as dyestuffs containing 2 to 4 cyclic nuclei in the color molecule of the type disclosed and claimed in U.S. Patent No. 2,739,080. The latter include certain azo-type dyes illustrated by Kohnstamm Orange, Oil Yellow (Calco), substituted anthraquinones suchas Plasto Violet (National Aniline), etc., and mixtures of the same.

The light-absorbing medium is incorporated into the plastic sheet 15 prior to lamination by various practices. When the light-absorbent material is a pigment, it is recommended that it be colloided into a portion of adhesive material, the latter then can act incidentally as at least a temporary support fort he light-absorbent materials. The pigment should be uniformly and discretely dispersed throughout the adhesive to produce a light-absorbing medium exhibiting uniform light absorption. In facilitating this, the pigment should be comminuted to a particle size of about 0.4 micron or less prior to blending with the adhesive. The blended material can then be extruded or cast into a film or layer to serve as a light-absorbent medium. When the light-absorbent material is a dyestuff, it is preferably deposited from solution onto a layer of adhesive. When the adhesive is a layer of polyvinyl butyral, as in the preferred embodiment, the dyestuff can be caused to diffuse into the adhesive material by aging under slightly heated conditions. Additional adhesive, beyond that which has been used to incorporate the absorbent material to and so form the light-absorbent light medium, can be used to further insure complete lamination between the components of the laminate. Other methods which can be used successfully in forming the light-absorbing medium include brushing, coating, etc. of the light-absorbent material with or without a vehicle including an adhesive directly onto the sheet 15.

The panel 1 which is substantially identical to the panel 2 provides the fourth component $C_4$ of the laminating structure. Naturally, the panels 1, 2 are transparent in the wave length range of light which is to be transmitted. As indicated above, this lower panel 2 is preferably the panel which does not directly receive the incident energy and should have a low radiation scattering coefficient to provide optical clarity.

Figure 2:
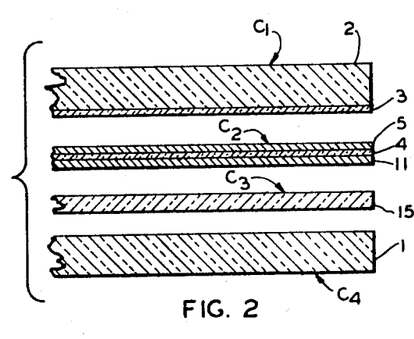
FIGURE 2 is a schematic front elevational view of the separated components forming part of the pellucid laminate prior to the lamination process.

Each of the aforementioned components $C_1$, $C_2$, $C_3$ and $C_4$ is suitably laminated into the composite structure or laminate A as shown in FIGURE 1. The four components are facewise disposed upon each other in marginal registration and in the selected order shown in FIGURE 2 in the laminating operation. The stacked components are then placed in a laminating chamber which is evacuated to a pressure of approximately 1 millimeter of mercury. Thereafter, the composite structure is heated to a temperature within the range of 170 to 230° F. The preferred temperature employed when the panels 1, 2 are glass and the plastic material employed is polyvinyl butyral is 200° F. After the composite structure has reached the preferred laminating temperature, pressure is applied to all exposed surfaces of the composite structure. The preferred pressure is approximately 200 pounds per square inch. The composite structure is then maintained at this preferred laminating temperature and laminating pressure for approximately 5 minutes. Thereafter, the temperature is reduced and the pressure is released and the various components $C_1$, $C_2$, $C_3$, and $C_4$ are molded in the laminate A.

By means of the above outlined method, a substantially clear and optically efficient laminate is achieved which is capable of reflecting a high percentage of infrared radiation and of selectively transmitting radiation in the visible wavelength range. It is to be noted that pressure is not only maintained on the upper and lower surfaces of the panels 1, 2 providing facewise forcing engagement of the various components but is also maintained on the side margins of each of the components.

In the laminated structures containing dichroic filters heretofore provided, the filter which usually consisted of a multilayer dielectric film was destroyed or suffered some distortion in the laminating process. Generally, the multilayer film was disposed between overlying and underlying layers of plastic material. The plastic material did not necessarily serve a structural function but may have served as an adhesive. Moreover, the plastic layer may not have been of a thickness to be considered an optically massive structure but it was of sufficient thickness to destroy the dichroic filter in the laminating process. Under the extreme pressures maintained in the laminating operation, the plastic material disposed in facewise engagement of the film of the dichroic filter would yield and the filter would crack into small particles. In fact, it was normally found that the filter would crack into particles having an overall length of 0.001 to 0.10″. When considering the overall thickness of the plastic layer in facewise engagement with the filter within this dimension, it can be realized that these various particles became randomly disoriented. While this does not always interfere with heat transmittance and reflectance, it virtually destroyed optical clarity, and moreover, interfered with color transmittance at various angles of incidence of view.

In the present method, the multilayer film 5 is supported on a plastic layer 4 and moreover is in substantial facewise engagement with a relatively hard panel 2. Actually, the multilayer film 5 is in engagement with the plastic film 3, but the latter is sufficiently thin so that for all practical purposes, the multilayer film 5 is retained in planar relationship to the panel 2 in the laminating process. It has been observed that there is some cracking of the multilayer film by this process, but the disorientation thereof is very slight. In fact, the cracked particles of the dichroic filter have a length of 50 to 100 microns and even larger. In many cases, very large particles of as much as 0.25 of an inch were observed. When it is realized that they can only become disoriented in the planar direction through the plastic layer 3 having a thickness of 0.5 to 1.0 micron, it can be seen that the disorientation is very slight. Accordingly, excellent results have been achieved by the aforementioned laminating process.

Figure 5:
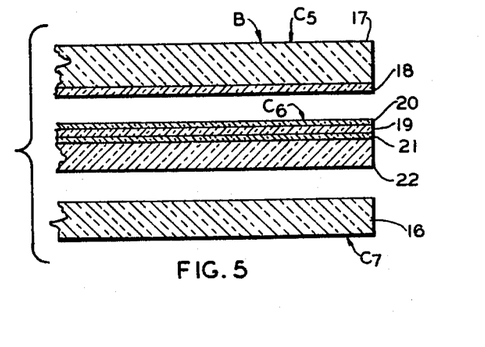
FIGURE 5 is a schematic front elevational view of the components forming part of the pellucid laminate of FIGURE 1 illustrating a modified form of laminating process.

It is possible to provide a modified form of laminating process in accordance with the present invention, which is more fully illustrated in FIGURE 5. In the laminate B illustrated in FIGURE 5, relatively flat panels 16, 17, which are substantially identical to the previously described panels 1, 2 respectively, are employed. A thin plastic layer 18 substantially identical to the previously described layer 3 is also deposited on the underside of the upper panel 17. A thin plastic supporting sheet or layer 19 similar to the supporting sheet 4 is provided with a dichroic filter 20 on its upper surface which is also substantially identical to the multilayer film 5. In this case, it should also be understood that the filter 20 may consist of a multilayer film having a plurality of dielectric layers substantially as shown in FIGURE 3. It may also consist of the metallic reflecting layer with one or more dielectric layers substantially as shown in FIGURE 4. The underside of the flat sheet 19 is provided with a single dielectric layer 21 substantially identical to the dielectric layer 4. This structure is then suitably laminated to a plastic layer 22 which is substantially identical to the plastic sheet 15.

In this manner, a three component structure is provided in the laminating process. The panel 17 with the lower coating of plastic 18 constitutes the first component $C_5$. The second component $C_6$ consists of the plastic layer 22 with the supporting plastic layer 19 having a filter 20 and a layer 21 thereon in a single composite structure. The third component $C_7$ includes the lower panel 16. In this embodiment of the invention, the three components are stacked in marginal registration in the manner as shown in FIGURE 5. The laminating procedure conducted is thereafter substantially identical to the laminating procedure described in the previous embodiment. It has again been found that the structure thus produced is a laminate of high optical clarity and exhibits good reflectance of infrared radiation and good selective transmittance of visible radiation.

In connection with the present invention, it should be understood that the layers of plastic 15 and 22 can be suitably incorporated with a conventional dye. In the prior art, the dye often interfered with the optical clarity and different colors were observed when the structure was viewed at various angles of incidence with respect to the normally flat surfaces thereof. The single dielectric film 11 and the dielectric layer 21 serve to decrease the angular dependence of color and consequently, it is now possible to add a suitable dye without obtaining undesired color rendition.

Figure 6:
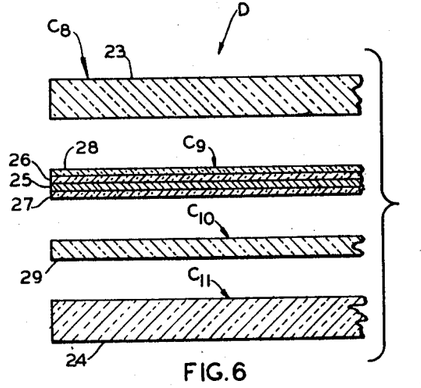
FIGURE 6 is a schematic front elevational view of the components forming part of the pellucid laminate of FIGURE 1 illustrating another modified form of laminating process.

It is possible to provide another modified form of laminating process in accordance with the present invention which is more fully illustrated in FIGURE 6. According to this process, a laminate D is formed by relatively flat upper and lower panels 23, 24, which are substantially identical to the previously described panels 1, 2 respectively, and are transparent within the wavelength range of radiation to be transmitted. A thin plastic supporting sheet or layer 25 substantially similar to the supporting sheet 4 is provided with a dichroic filter 26 on its upper surface which is substantially identical to the multilayer film 5. In this modification, it should also be understood that the dichroic filter 26 may consist of a multilayer film having a plurality of dielectric layers substantially as shown in FIGURE 3. It may also consist of the metallic reflecting layer with one or more dielectric layers substantially as shown in FIGURE 4. The underside of the relatively flat supporting sheet 25 is provided with a monolayer dichroic filter or single dielectric layer 27, which is substantially identical to the dielectric layer 4.

Deposited on the upper surface of the dichroic filter 26 is a relatively thin plastic material layers 28 of not less than 0.05 micron thick and not greater than 10.0 micron thick and which is substantially identical to the thin plastic layer 3. This thin plastic layer was previously deposited on the underside of the panel 2 in the previous embodiment of this invention. It can thus be seen that in this embodiment of the invention, the plastic layer 28 is no longer deposited on the underside of the panel 23 but rather on the upper surface of the dichroic filter 26. The thin plastic layer 28 may also be thermoplastic or thermosetting in nature and may be any of the plastic materials from which the layer of plastic material 3 is formed. A plastic sheet 29, which is substantially similar to the plastic sheet 15, is provided for deposition between the supporting sheet 25 and the transparent panel 24. The palstic sheet 15 is also designed to reduce the angular dependency of color in the laminated structure and is formed of any of the materials from which the plastic sheet 15 is formed. Again, suitable light-absorbing pigments may be incorporated in the sheet of plastic 29.

In this manner, a four component structure is provided in the laminating process. The upper panel 23 constitutes the first component $C_8$. The second component $C_9$ consists of the thin plastic supporting layer 25 with the dichroic filters 26, 27 on opposite sides thereof and the thin plastic layer 28 on the upper surface of the dichroic filter 26. The third component $C_{10}$ consists of the relatively thick plastic sheet 29 and the fourth component $C_{11}$ consists of the bottom panel 24. In this embodiment of the invention, the four components are stacked in marginal registration in the manner as shown in FIGURE 6 and the laminating procedure conducted thereafter is substantially identical to the laminating procedure described in the previous embodiments of this invention.

It has again been found that this structure produces a laminate of high optical clarity and which exhibits good reflectance of infrared radiation and good selective transmitance of visible radiation. This type of laminating structure has a distinct advantage over the previously described embodiments in that the component $C_9$ is sufficiently flexible so that it can be rolled for storage and shipment. As previously indicated, the thin plastic supporting layer 25 has a thickness preferably within the range of 0.00025" to 0.0050". The lower size limitation is determined so that the layer 25 has sufficient supporting strength. The plastic layer, when formed of polyvinyl butyral is so thin that it can be rolled or folded without destroying the plastic sheet. Moreover, the dichroic filters deposited thereon are sufficiently thin so that they will not be destroyed or in any way deleteriously affected if the component $C_9$ is rolled. Obviously, great pressure cannot be applied to this particular component due to the fact that extreme pressure may crack one or both of the dichroic filters on the supporting sheet 25.

Figure 7:
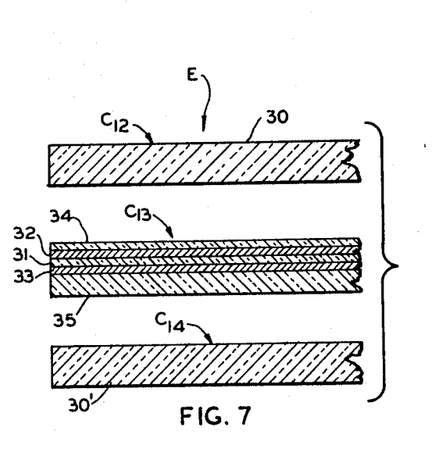
FIGURE 7 is a schematic front elevational view of the components forming part of the pellucid laminate of FIGURE 1 illustrating an additional modified form of laminating process.

It is possible to provide an additional modified form of laminating process in accordance with the present invention, which is more fully illustrated in FIGURE 7. The laminate E produced by this process comprises relatively flat spaced opposed panels 30, 30' which are substantially identical to the previously described panels 1, 2 and are transparent within the wavelength range of radiation to be transmitted. A thin plastic supporting sheet 31 similar to the supporting sheet 4 is provided with a dichroic filter 32 on its upper face, which is also substantially identical to the previously described multilayer film 5. In this embodiment, it should be understood that the filter 32 may consist of a multilayer film having a plurality of dielectric layers, substantially as shown in FIGURE 3. It may also consist of the metallic reflecting layer with one or more dielectric layers substantially as shown in FIGURE 4. The underside of the relatively flat sheet 31 is provided with a single dielectric layer 33 serving as a filter which is substantially identical to the previously described dielectric layer 4.

Deposited on the upper surface of the dichroic filter 32 is a relatively thin plastic polymerizable sheet or layer 34 which is substantially identical to the previously described layer 31 also formerly deposited on the underside of the panel 17. The plastic layer 34 may be thermoplastic or thermosetting in nature and may be formed of any of the materials from which the plastic material 3 is formed. Actually, it should not be less than 0.05 micron and not greater than 10.0 micron thick. This structure is suitably laminated to a plastic layer 35, which is substantially identical to the sheet layer 15.

In this manner, a three component structure is provided in the laminating process. The upper panel 30 constitutes the first component $C_{12}$. The second component $C_{13}$ comprises the thin plastic supporting sheet 31 with dichroic filters 32, 33, the polymerizable plastic layer 34 and the thick plastic layer 35. The third component $C_{14}$ includes the lower panel 30'. In this embodiment of the invention, the three components are stacked in marginal registration in the manner as shown in FIGURE 7. The laminating procedure is thereafter substantially identical to the laminating procedures described in the previous embodiments of this invention. It has again been found that the structure produced in this embodiment is a laminate of high optical clarity and exhibits good reflectance of infrared radiation and good selective transmittance of visible radiation.

THEORY

Figure 8:
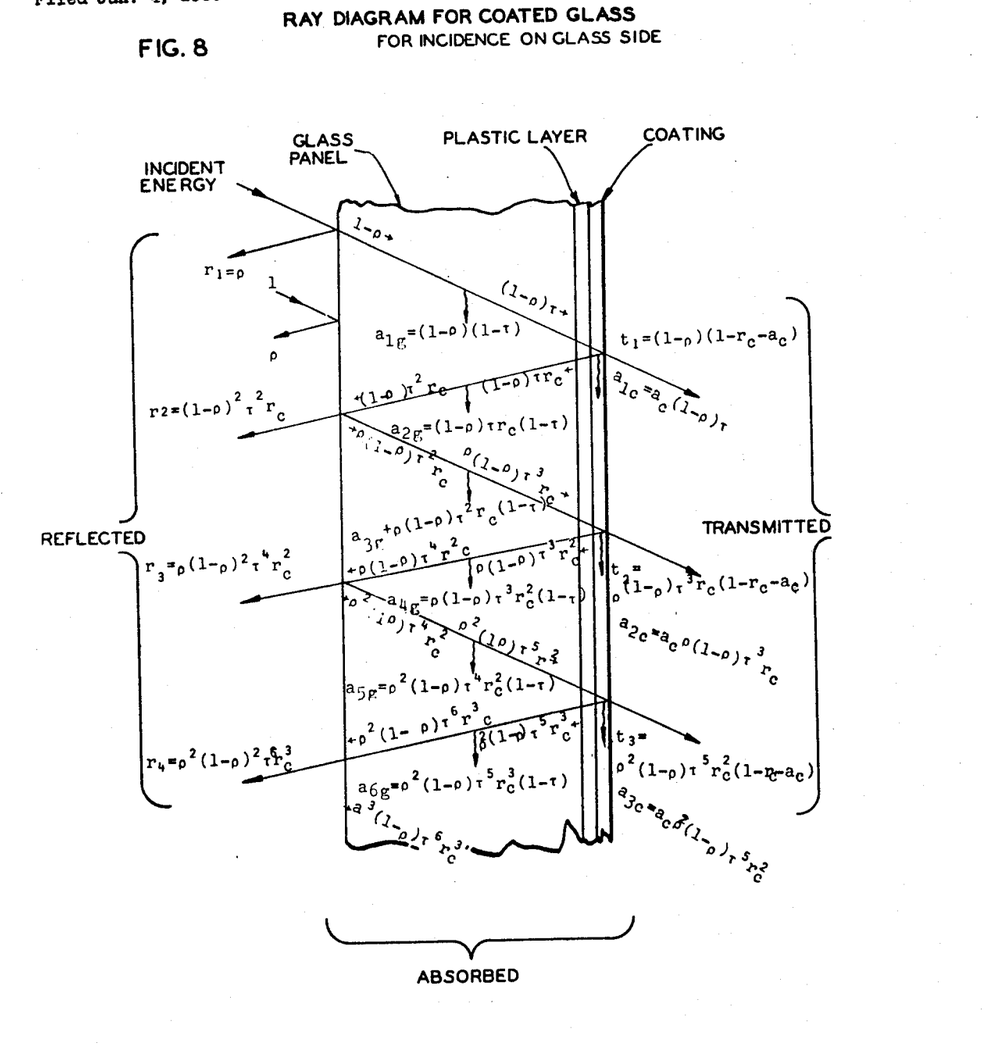
FIGURE 8 is a schematic view showing the energy distribution in a transparent panel having an optical filter and where radiation is incident upon the side opposite the optical filter.
Figure 9:
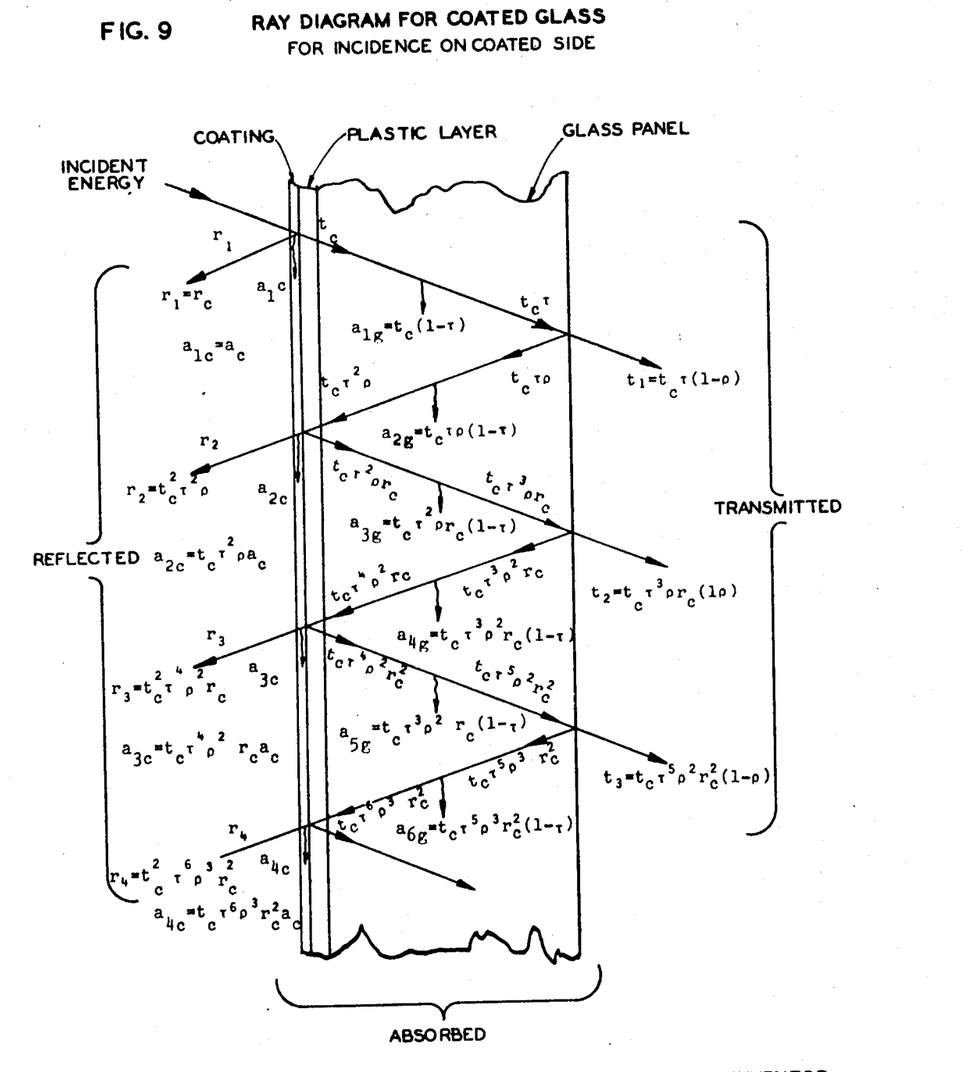
FIGURE 9 is a schematic view showing the energy distribution in a transparent panel having an optical filter and where radiation is incident upon the side having the optical filter.
Figure 10:
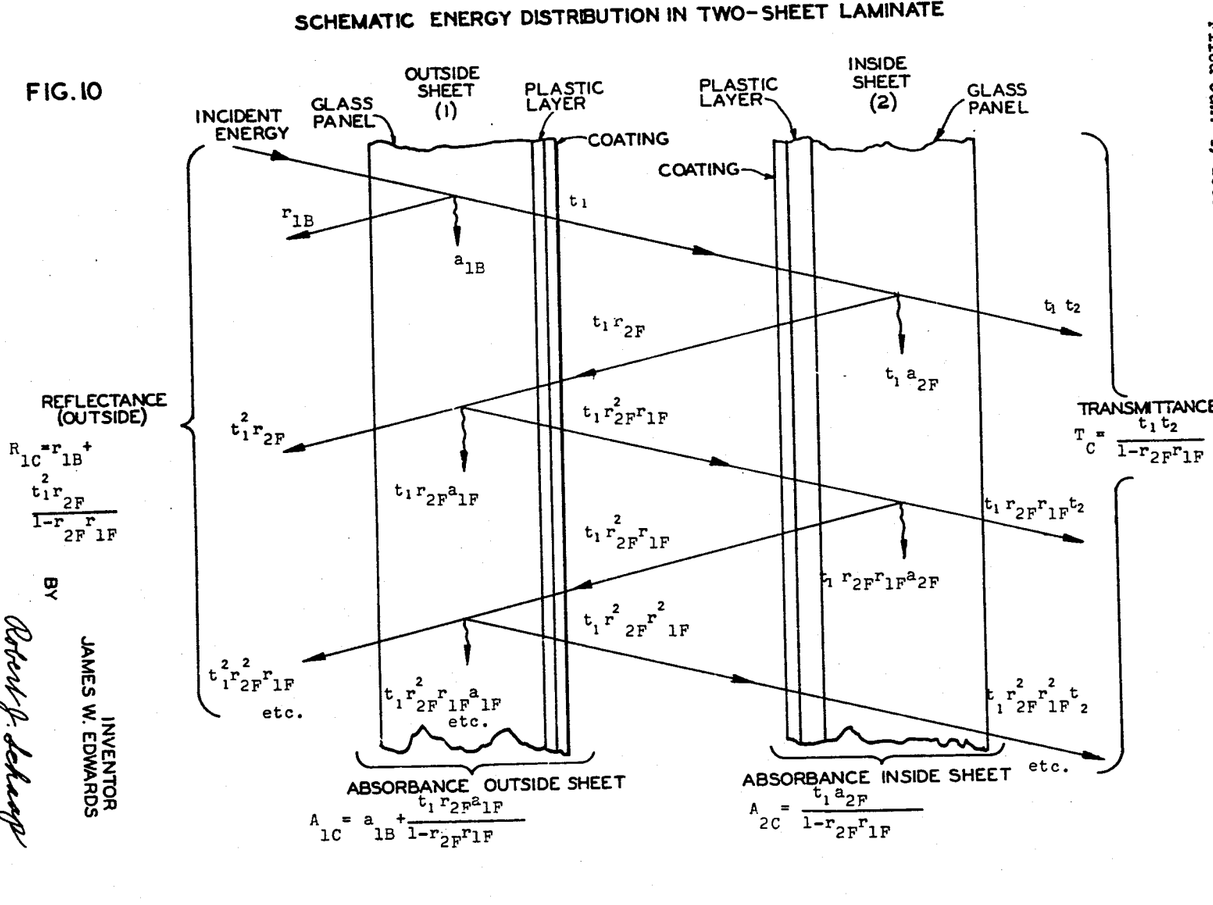
FIGURE 10 is a schematic view showing the energy distribution in a combination of the transparent panels of FIGURES 8 and 9 to form a pellucid laminate of the type constructed in accordance with and embodying the present invention.

In order to understood the calculations of effective transmittance and absorbance of radiation in the laminated structures previously described, the following optical theory has been developed and is deemed to be of pertinence. The following theory will provide dimensions for the calculations for the properties of the laminates when given the reflectance, transmittance and absorbance as functions of wavelengths (or mean values of these properties over a wavelength interval) of the panels and coatings. It can be assumed that the transmittance $t_g$ of the glass is determined by direct measurements and that reflectance $r_g$ and that absorbance $a_g$ are directly calculatable from the transmittance and refractive index. In general, the properties of the coated structures are different for incidence from each side and the calculations take this difference into consideration. Accordingly, energy distribution patterns have been established for each of the panels which comprises the laminate substantially as shown in FIGURES 8 and 9. In FIGURE 8, a ray diagram is illustrated for coated glass where the radiation is incident on the glass side and not the surface having the coating. In FIGURE 9, a ray diagram is presented where the radiation is incident on the coated side of the glass surface. FIGURE 10 is a composite ray diagram for the laminated panels shown in FIGURES 8 and 9. For the following mathematical description, the following properties are defined:

*Glass.*—For a sheet of glass, we define the properties:

$\rho$ = reflection coefficient at the air/glass interface $$= \left(\frac{n_0 - n_1}{n_0 + n_1}\right)^2 \quad (1)$$

where $n_0$ = refractive index of air  (2)
$n_1$ = refractive index of glass  (3)
$\tau$ = internal transmittance of glass $$= e^{-\alpha x} = \frac{I}{I_0} = \frac{\text{transmitted intensity}}{\text{incident intensity}} \quad (4)$$

where $\alpha$ = the linear absorption coefficient and $x$ = distance traversed by the radiation and will usually be taken as the thickness (or slant thickness) of the glass.

*Transmittance.*—Glass.

$t_g$ = transmittance of glass plate.

$$= \frac{\text{transmitted intensity}}{\text{incident intensity}} = \frac{(1-\rho)^2 e^{-\alpha x}}{1 - \rho^2 e^{-2\alpha x}} \quad (5a)$$

$$\approx = (1-\rho)^2 e^{-\alpha x} \text{(for low } \alpha) \quad (5b)$$

$$\approx = \frac{1-\rho}{1+\rho} \text{(for low } \alpha) \quad (5c)$$

$$\approx = (1-\rho)^2 \text{(for low } \alpha \text{ and } \rho) \quad (5d)$$

$$\text{O.D.} = \text{optical density} = \log \frac{1}{t_g} = \log \frac{I_0}{I} \quad (6)$$

$$= \log \frac{1 - \rho^2 e^{-2\alpha x}}{(1-\rho)^2} + \frac{\alpha x}{2.3} \quad (7)$$

For small $\rho$, Eq. 7 becomes $$\text{O.D.} = \frac{\alpha x}{2.3} - \log(1-\rho)^2 \quad (8)$$

For glass, where $\rho$ is small, usually about 0.04, the internal transmittance is obtained from Eqs. 4 and 5b as $$\tau = \frac{t_g}{(1-\rho)^2} \text{ (for small } \rho) \quad (9)$$

*Reflectance.*—Glass.

$$r_g = \text{reflectance of glass plate} = \frac{I(\text{reflected})}{I_0(\text{incident})}$$

$$= \rho \left\{1 + \frac{(1-\rho)^2 e^{-2\alpha x}}{1 - \rho^2 e^{-2\alpha x}}\right\} \quad (10)$$

$$= \frac{2\rho}{1+\rho} \text{ for low } \alpha \quad (11)$$

$$= \rho[1 + (1-\rho)^2 \tau^2] = \rho\left[1 + \frac{t_g^2}{(1-\rho)^2}\right] \text{ (for low } \alpha) \quad (12)$$

*Absorbance.*—Glass.

$$a_g = \text{absorbance of glass plate} = \frac{I(\text{absorbed})}{I_0(\text{incident})}$$

$$= \frac{(1-\rho)(1-e^{-\alpha x})}{1-\rho e^{-\alpha x}} \quad (13)$$

$$= \frac{(1-\rho)(1-\tau)}{1-\rho\tau} \quad (14)$$

Having thus defined the properties of the glass or transparent laminates, it is now necessary to define the properties of the multilayer films and monolayer films employed in the present invention. For the purpose of this theory, the films, both multilayer and monolayer, will be referred to as "coatings," and the properties of the "coatings" will be designated by a subscript $c$. Before examining the energy distribution for the composite laminated structure, it is necessary to examine the energy distribution of each panel with its associated interference filter.

As previously indicated, two interference filters are provided in each of the embodiments of the present invention. One of the interference filters is a multilayer film which may consist of a metallic layer and one or more dielectric layers or just a series of dielectric layers. The other interference filter is the monolayer filter preferably formed of lead oxide. The thin plastic material 3 on the underside of the panel 2 does not in any way interfere or effect the energy distribution through the panel. According, FIGURE 8 represents the panel 2 with the multilayer film 5 on the inner surface thereof. The transparent panel in FIGURE 9 represents the transparent panel 1 with the thick laminatable plastic and the interference filter 11 on one flat surface. The plastic sheets employed in the present invention have refractive indices which are substantially similar to the outer panels so that the reflection at the panel-plastic interface is negligible, though reflectance occurs at the interface of the combined panel and plastic sheets with the interference filters. Accordingly, FIGURES 8, 9 and 10 are representative of the schematic energy distribution through the laminates of the present invention.

Results are given in terms of transmittances (percentage) and mean transmittances for films on glass substrates. The effect of the glass/coating interface is included as a property of the coating. This has been taken into account in using measured transmittances of glass. It has been shown that transmittance and reflectance each have the same values for incidence from either the glass or the air side of the coating. For the MLF coatings the following properties are defined:

$t_c$ = transmittance of coating (from computer program)
$r_c$ = reflectance of coating
$a_c$ = absorbance of coating

Having thus described the definitions of the properties of the coatings, it is possible to establish equations for the reflectance, transmittance and absorbance of energy on a single panel where radiation is incident upon the glass side. Schematic energy distribution for this panel is illustrated in FIGURE 8. In this diagram the fractional distribution of energy of an incident ray is shown. Summation of these rays gives the distribution of intensity between reflection, transmission and absorption.

*Reflection.*—From FIGURE 8 the reflectance $r$, is given by:

$$r = r_1 + r_2 + r_3 + \cdots$$
$$= \rho + (1-\rho)^2[\tau^2 r_c + \rho \tau^4 r_c^2 + \rho^2 \tau^6 r_c^3 + \cdots] \quad (15)$$
$$= \rho + (1-\rho)^2 \tau^2 r_c[1 + \rho \tau^2 r_c + \rho^2 \tau^4 r_c^2 + \rho^3 \tau^6 r_c^3 + \cdots]$$
$$= \rho + \frac{(1-\rho)^2 \tau^2 r_c}{1 - \rho \tau^2 r_c} \quad (16)$$

since $1 + x + x^2 + \cdots = \frac{1}{1-x}$ for $-1 < x < 1$

*Absorption.*—From FIGURE 8 the absorbance for incidence on the glass sides is seen to be:

$$a = a_{1g} + a_{2g} + \cdots + a_{1c} + a_{2c} + \cdots$$
$$= (1-\rho)(1-\tau)\{1 + \rho \tau^2 r_c + \rho^2 \tau^4 r_c^2 + \cdots\} \quad (17)$$
$$+ (1-\rho)(1-\tau)\tau r_c\{1 + \rho \tau^2 r_c + \rho^2 \tau^4 r_c^2 + \cdots\}$$
$$+ (1-\rho)a_c \tau\{1 + \rho \tau^2 r_c + \rho^2 \tau^4 r_c^2 + \cdots\}$$
$$= (1-\rho)\left\{\frac{(1-\tau) + (1-\tau)\tau r_c + a_c \tau}{1 - \rho \tau^2 r_c}\right\} \quad (18)$$

*Transmission.*—From FIGURE 8 the transmittance for incidence on the glass side is:

$$t = t_1 + t_2 + t_3 + \cdots$$
$$= (1-\rho)\tau(1 - r_c - a_c)(1 + \rho \tau^2 r_c + \rho^2 \tau^5 r_c^2 + \cdots) \quad (19)$$

$$t = \frac{(1-\rho)\tau(1 - r_c - a_c)}{1 - \rho \tau^2 r_c} \quad (20a)$$

and $$t = \frac{(1-\rho)\tau t_c}{1 - \rho \tau^2 r_c} \quad (20b)$$

since $r_c + a_c + t_c = 1$

It is possible to establish a check for the equations determining the reflectance, absorbance and transmittance of energy where radiation is incident on the glass side. The sum of reflected, absorbed, and transmitted intensities should equal the incident intensity, i.e.

$$r + a + t = 1$$

Adding Equations 16, 18, and 20 gives $$r + a + t =$$
$$\rho + (1-\rho)\left\{\frac{(1-\rho)\tau^2 r_c + (1-\tau) + (1-\tau)\tau r_c + a_c \tau + \tau(1 - r_c - a_c)}{1 - \rho \tau^2 r_c}\right\}$$
$$= \rho + (1-\rho)\{1\} = 1$$

The equations thus fit this condition. They also reduce to the simpler Equations 5a, 10, and 14, when $\rho$ is substituted for $r_c$, $a_c$ is taken identical to zero and Equation 4 is used for $\tau$.

Having thus established equations for the reflectance, transmittance and absorbance of energy where radiation is incident on the glass side, it is now possible to establish equations for reflectance, transmittance and absorbance of energy in a coated panel where the radiation is incident on the coated side. The schematic energy distribution of this panel is illustrated in FIGURE 9. In this diagram, the fractional distribution of energy of an incident is shown. Summation of these rays gives the distribution of intensity between reflection, transmission and absorption.

*Reflection.*—From FIGURE 9 the reflectance $r$, for incidence on coated side is given by, $$r = r_1 + r_2 + r_3 + \cdots \quad (21)$$
$$= r_c + t_c^2 \tau^2 \rho\{1 + \tau^2 \rho r_c + \tau^4 \rho^2 r_c^2 + \cdots\}$$
$$= r_c + \frac{t_c^2 \tau^2 \rho}{1 - \tau^2 \rho r_c} \quad (22)$$

*Absorption for incidence on coated side.*—From FIGURE 9 the absorbance is:

$$a = a_{1c} + a_{2c} + \cdots + a_{1g} + a_{2g} + \cdots \quad (23)$$
$$a = a_c[1 + t_c \tau^2 \rho(1 + \tau^2 \rho r_c + \tau^4 \rho^2 r_c^2 + \cdots)]$$
$$+ t_c(1-\tau)[(1 + \tau^2 \rho r_c + \tau^4 \rho^2 r_c^2 + \cdots)$$
$$+ \tau \rho(1 + \tau^2 \rho r_c + \tau^4 \rho^2 r_c^2 + \cdots)]$$
$$a = a_c + \frac{a_c t_c \tau^2 \rho + t_c(1-\tau)(1+\tau \rho)}{1 - \tau^2 \rho r_c} \quad (24)$$

*Transmission for incidence on coated side.*—From FIGURE 9 the transmission is:

$$t = t_1 + t_2 + \cdots$$
$$= t_c \tau(1-\rho)(1 + \tau^2 \rho r_c + \tau^4 \rho^2 r_c^2 + \cdots)$$
$$t = \frac{t_c \tau(1-\rho)}{1 - \tau^2 \rho r_c} \quad (25)$$

It can be seen that this was the same result as was obtained for transmission for incidence on the glass side, Equation 20, when we substitute $(1 - r_c - a_c)$ for $t_c$. This result is consistent with measurements on "anisotropic" reflectors prepared by vacuum evaporation of metal and dielectric thin films.

It is also possible to establish a check of the equations for the reflectance, absorbance and transmittance of energy where radiation was incident on the coated side of the panel. The sum of reflected, absorbed, and transmitted intensities should equal the incident intensity, taken as unity, i.e.

$$r + a + t = 1$$

To test this add Equations 22, 24 and 25, obtaining, $$r + a + t =$$
$$r_c + a_c + \frac{t_c^2 \tau^2 \rho + a_c t_c \tau^2 \rho + t_c(1-\tau)(1+\tau \rho) + t_c \tau(1-\rho)}{1 - \tau^2 \rho r_c}$$
$$= r_c + a_c + t_c\left[\frac{t_c \tau^2 \rho + a_c \tau^2 \rho + 1 + \tau \rho - \tau - \tau^2 \rho + \tau - \tau \rho}{1 - \tau^2 \rho r_c}\right]$$
$$= r_c + a_c + t_c\left[\frac{\tau^2 \rho(t_c + a_c - 1) + 1}{1 - \tau^2 \rho r_c}\right]$$

Now $r_c+a_c+t_c=1$ or $t_c+a_c-1=-r_c$, hence the expression in brackets equals unity so the equation reduces to $$r+a+t=r_c+a_c+t_c$$

both sides of which equal unity, showing that the derived equations fit the above stated condition required for a check.

It is now possible to calculate the reflectance $R_c$, the absorbance $A_c$ and the transmittance $C_c$ for the composite laminate structures illustrated. A ray diagram for this calculation is provided in FIGURE 10. For the ray diagram of FIGURE 10, the ray diagrams of single panel structures in FIGURES 8 and 9 were combined. For the outer sheet, a subscript "1" will be used for the reflectance, absorbance and transmittance. For the inside sheet, the subscript "2" will be used in these relationships. The following equations relate the properties of the laminate to properties of individual sheets. The measured or calculated properties of individual coated sheets can be used to calculate the properties of the composite structure or laminate. The following relationship provides a measurement of the outside reflectance.

$$R_{1C}=r_{1B}+\frac{t_1^2 r_{2F}}{1-r_{2F}r_{1F}}$$

The above relationship shows a strong dependence on the transmittance $t$, and indicates that for heat reflection, the outer panel must have high transmittance.

The following relationship provides the absorbance of the outside sheet.

$$A_{1C}=a_{1B}+\frac{t_1 r_{2F} a_{1F}}{1-r_{2F}r_{1F}}$$

The following relationship provides the transmittance of the inside sheet.

$$T_C=\frac{t_1 t_2}{1-r_{2F}r_{1F}}$$

The following relationship provides the absorbance of the inside sheet.

$$A_{2C}=\frac{t_1 a_{2F}}{1-r_{2F}r_{1F}}$$

As an outer sheet the radiation will be incident on the glass side (designated *back* side, subscript $b$ to be added to $r$, $a$, and $t$), while as an inner sheet the radiation will be incident on the coated side (designated *front*, subscript $f$). The quantities $r$, $a$, and $t$ calculated by Equations 16, 18, and 20 thus become $r_{1b}$, $a_{1b}$, and $t_{1b}$ when for an outside sheet for incidence on the glass (back) side, and Equations 22, 24, and 25 give $r_{1f}$, $a_{1f}$, $t_{1f}$. For the inside sheet the subscript 1 would become 2.

Since we are interested in the effect of solar energy, R's, A's and T's used are the mean values for several spectral ranges of the solar spectrum weighted against the intensity of solar radiation. For example, the visible reflectance of one particular sheet is $$r_{vis}=\frac{\int r_\lambda G_\lambda d\lambda}{\int G_\lambda d\lambda}$$

where:

$\lambda$=wave length
$r_\lambda$=reflectivity at $\lambda$
$G_\lambda$=solar radiation intensity at $\lambda$
$r_{vis}$=mean reflectivity for visible radiation having the distribution of the sun's visible radiation.

The properties $R_c$, $A_{1c}$, $A_{2c}$, and $T_c$ for the various spectral ranges can thus be calculated. This calculation will give total solar reflectance $R_{TC}$, absorbance by outer and inner sheets and transmittance of the composite structure. From these calculations, heat rejection performance can be evaluated.

EXAMPLES

The invention is further illustrated by but not limited to the following examples:

Example I

A number of laminates employing different types of dichoric filters and different types of panels were analyzed for visible transmittance, heat reflectance, heat admittance, heat rejection and heat absorbance. The following table sets forth the data for the various laminates analyzed.

SOLAR ENERGY PERFORMANCE [a] OF MLF COMPOSITE LAMINATES

|  | Sample | | | | |
|---|---|---|---|---|---|
|  | A | B | C | D | E |
| Visible reflectance, percent: | | | | | |
| Inside | 10.4 | 10.4 | 10.6 | 9 | 7 |
| Outside | 6.4 | 6.4 | 7.3 | 10.6 | 7.8 |
| Visible transmittance | 20.7 | 20.7 | 20.7 | 16.6 | 21.8 |
| Heat reflected | 24.2 | 38.4 | 23.7 | 22.3 | 23.0 |
| Heat admitted | 39.8 | 38.3 | 40.7 | 41.4 | 42.9 |
| Heat rejected | 59.9 | 61.6 | 59.3 | 58.6 | 57.1 |
| Heat absorbed by outer sheet [b] | 45.1 | 28.3 | 44.9 | 47.0 (54.4) | 43.8 (51.2) |

[a] Results are for 30° angle of incidence of solar radiation at sea level after traversing two air masses. Data for the visible range are percent of visible energy. Data for "Heat Reflected", etc., are percent of total solar energy.
[b] Values in parentheses are total energy absorbed by the laminates.

Sample A employed a ⅛" thick outer panel formed of Pittsburgh Plate Glass Company "Pennveron" Graylite GL–31 glass. The inner panel was of equal thickness and formed of Pittsburgh Plate Glass Company "Pennveron" Graylite GL–61. The plastic layer employed was a 0.020" thick layer of plasticized polyvinyl butyral sold under Monsanto Company's trademark "Saflex." The solar energy transmittance of the two panels which were employed in this example is set forth below.

TABLE I.—SOLAR ENERGY TRANSMITTANCE OF PENNVERNON GRAYLITE SHEET GLASS AT 30° ANGLE OF INCIDENCE

| Interval | Range (microns) | Percent of Total Energy | "14" Graylite, 30° Incidence | "31" Graylite, 30° Incidence | "61" Graylite, 30° Incidence |
|---|---|---|---|---|---|
| UV | 0.3–0.4 | 2.7 | 65.1 | 7.1 | 72.6 |
| Visible | 0.4–0.7 | 44.4 | 18.1 | 35.4 | 62.0 |
| IR–1 | 0.7–1.12 | 36.4 | 59.5 | 73.6 | 78.2 |
| IR–2 | 1.12–1.38 | 8.6 | 49.3 | 59.0 | 74.5 |
| IR–3 | 1.38–1.85 | 6.6 | 54.9 | 70.1 | 79.6 |
| IR–4 | 1.85–2.14 | 1.2 | 50.8 | 68.4 | 78.3 |
| Total | 0.3–2.14 | 100.0 | 40.0 | 55.0 | 70.6 |
| Total IR | 0.7–2.14 | 52.8 | 57.0 | 70.6 | 77.8 |
| Thickness | | | 7/32 | D.S. | 3/16 |

The angle of incidence employed for the measurement of 30°. The filter employed was a three layer multilayer film consisting of alternating layers of lead oxide and cryolite. Lead oxide formed the outer layers which is the high index of refraction material and the inner layers are cryolite which is the low index of refraction material. The single layer dielectric material was lead oxide. Each of the aforementioned layers had ¼ wavelength thickness.

The Sample B was substantially similar to the Sample A except that the sample employed a 7 layer multilayer film consisting of alternating layers of lead oxide and cryolite each having a thickness of ¼ wavelength.

Sample C was substantially similar to Sample B except that the sheets of glass were separated by a relatively thin air space.

Sample D differed from Sample A in that the dichroic filter employed was a seven layer film, four layers of which had an index of refraction of 2.4 and 3 alternating layers which had an index of refraction of 1.37. The wavelength of the film was also designed to be 0.90.

Sample E was substantially similar to Sample A except that the "Saflex" layer was eliminated and an air gap of the same thickness was employed.

The results obtained are for an angle of incidence of 30° of solar radiation at sea level. The data for the visible range is given in the percent of visible energy. The data for the heat reflected, the heat admitted, the heat rejected, and the heat absorbed is given in percent of the total solar energy.

Example 2

The heat insulating and glare reducing properties of a pellucid laminate constructed in accordance with the present invention were determined in this example. The laminate formed was of the type illustrated in FIGURES 1 and 2 and consisted of outer glass panels each of which was sufficiently thick to constitute massive layers. The thin layer of laminatable plastic 3 on the underside of the panel 2 was formed of plasticized polyvinyl butyral having a thickness of 1 micron. The supporting film for the interference filters was formed of a gelled cellophane material and had a thickness of 0.001″. The upper surface of the supporting layer 4 was provided with a multi-layer film consisting of four alternating layers of lead oxide and three alternating layers of cryolite. The multi-layer film was designed with a wavelength of 0.88 micron. The single layer film was formed of lead oxide with an overall thickness which is equal to one fourth the design wavelength range to be reflected. The single layer film was designed with a wavelength of 0.88 micron. The thick plastic layer 15 was formed of four different materials and the properties of the pellucid laminate was determined in each of these four cases.

In the first case, the layer 15 was formed of a plasticized polyvinyl butyral (marketed under the trademark "Saflex") having an overall thickness of approximately .020″. The following reflectance and transmittance data was obtained for the ultraviolet wavelength range, the visible wavelength range and the infrared wavelength range. The total transmittance and reefictance is also provided. The angle of incidence of solar radiation was 30 degrees.

TABLE II

| | $R_{30}°$, percent | $T_{30}°$, percent |
|---|---|---|
| Ultraviolet | 18.3 | 1.5 |
| Visible | 22.3 | 47.2 |
| Infrared | 60.6 | 27.2 |
| Total | 42.5 | 35.3 |

The heat rejected considering a conduction factor of one-half each way was 53.6%. The heat rejected considering a conduction factor of two-thirds to the outside and one-third inside was 57.3%.

In the second case, the same laminate was employed except that the layer 15 was formed of a plasticized polyvinyl butyral having a suitable neutral absorbing additive content to give 55% transmittance. The absorbing additive may be any of the neutral additives listed above which are suitable for incorporation into the layer 15. This plastic layer is sold under the trademark "Shadowlite 55." Reflectance and transmittance data was determined for each of the three wavelength ranges and the total thereof at an angle of incidence of solar radiation at 30°.

TABLE III

| | $R_{30}°$, percent | $T_{30}°$, percent |
|---|---|---|
| Ultraviolet | 18.3 | .8 |
| Visible | 22.3 | 26.0 |
| Infrared | 60.6 | 15.0 |
| Total | 42.5 | 19.4 |

Considering a conduction factor of one-half, the total heat rejection was 61.5%. Considering conduction factors of two-thirds and one-third, the total heat rejection was 67.9%.

The same pellucid laminate was again employed except that the plastic layer 15 was formed of a plasticized polyvinyl butyral material having a suitable neutral absorbing additive content to give 28% transmittance. This material is sold under the trademark "Shadowlite 28." The reflectance and transmittance was determined for each of the three wavelength ranges and the total in solar radiation was directed thereon at an angle of incidence of 30°.

TABLE IV

| | $R_{30}°$, percent | $T_{30}°$, percent |
|---|---|---|
| Ultraviolet | 18.3 | .4 |
| Visible | 22.3 | 13.2 |
| Infrared | 60.6 | 7.6 |
| Total | 42.5 | 9.9 |

Considering an absorbance factor of one-half, the total heat rejection was 66.3%. Considering an absorbance factor of two-thirds, the total heat rejection was 74.1%.

The same plastic laminate was again employed except that the layer 15 was formed of dry air. The reflectance and transmittance of each of the above wavelength ranges and the total was established when solar radiation was directed on the laminate at an angle of incidence of 30°.

TABLE V

| | $R_{30}°$, percent | $T_{30}°$, percent |
|---|---|---|
| Ultraviolet | 18.5 | 1.2 |
| Visible | 23.9 | 37.4 |
| Infrared | 65.6 | 23.6 |
| Total | 45.8 | 29.1 |

Considering a heat conduction factor of one-half, the total heat rejection was 57.4%. Considering a heat conduction factor of two-thirds outside and one-third inside, the total heat rejection was 62.2%.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. A pellucid laminate for selective reflectance of a first spectral wavelength distribution and selective transmittance of a second spectral wavelength distribution of radiation where the first and second distributions are included in an extended spectral wavelength range, said laminate comprising first and second spaced outer panels transparent in the wavelength range of radiation to be transmitted, a support panel interposed between said outer panels and being transparent in the wave length range of radiation to be transmitted, a selective multilayer interference filter interposed between the first of said outer panels and said support panel and being designed to reflect a substantial portion of the radiation in the first wavelength distribution and transmit a substantial portion of radiation in the second wavelength distribution, and a monolayer interference filter interposed between the second outer panel and support panel and being designed to reflect a portion of the radiation in the second wavelength distribution and to reduce color dependency.

2. The pellucid laminate of claim 1 further characterized in that said multilayer interference filter includes a plurality of alternating layers of dielectric materials having high and low indexes of refraction respectively.

3. The pellucid laminate of claim 2 further characterized in that said multilayer interference filter includes an optically thin metallic reflector.

4. The pellucid laminate of claim 2 further characterized in that said monolayer interference filter is a single layer of dielectric material.

5. The pellucid laminate of claim 1 further characterized in that a radiation absorbing medium is incorporated in said support panel to reduce angular dependency of color in the radiation in the extended spectral range.

6. The pellucid laminate of claim 1 further characterized in that each of said panels are substantially rigid.

7. The pellucid laminate of claim 1 further characterized in that radiation of the first spectral wavelength distribution is infrared radiation and radiation of the second spectral wavelength distribution is visible light.

References Cited

UNITED STATES PATENTS

| | | | |
|---|---|---|---|
| 2,392,978 | 1/1946 | Dimmick | 350—164 |
| 2,418,605 | 4/1947 | Shepherd et al. | 117—3.33 X |
| 2,624,239 | 1/1953 | Blout et al. | 117—33.3 |
| 3,011,383 | 12/1961 | Sylvester et al. | 350—1 |
| 2,418,605 | 4/1947 | Shepherd et al. | 17—33.3 X |
| 3,279,317 | 10/1966 | Ploke | 350—1 |
| 3,290,203 | 12/1966 | Antonson et al. | |
| 3,298,898 | 1/1967 | Gall | 350—1 X |

FOREIGN PATENTS 742,530  12/1955  Great Britain.

DAVID H. RUBIN, Primary Examiner

U.S. Cl. X.R.

117—33.3; 156—99; 161—1; 350—166, 316